United States Patent [19]
Christison

[11] 3,797,325
[45] Mar. 19, 1974

[54] TWO SPEED PRIMARY DRIVE ASSEMBLY FOR HYDRAULIC WINCH

[75] Inventor: Sommerville G. Christison, Delta, British Columbia, Canada

[73] Assignee: Gearmatic Co. Ltd., Surrey, British Columbia, Canada

[22] Filed: June 7, 1971

[21] Appl. No.: 150,399

[52] U.S. Cl............... 74/339, 74/750 R, 192/4 R, 192/55, 254/187
[51] Int. Cl............................................. F16h 3/38
[58] Field of Search........... 74/339, 750 R; 254/185, 254/187; 192/4 R, 55, 4 C

[56] References Cited
UNITED STATES PATENTS

| | | | |
|---|---|---|---|
| 2,948,412 | 8/1960 | Nix.................. | 192/4 R X |
| 3,686,978 | 8/1972 | Knoblach et al............. | 74/750 R X |
| 1,126,374 | 1/1915 | Breth................... | 192/55 |
| 1,387,017 | 8/1921 | Smith.................. | 192/55 |
| 1,939,226 | 12/1933 | Rauen.................. | 192/55 X |
| 2,108,986 | 2/1938 | Klimek................ | 74/339 X |
| 2,438,381 | 3/1948 | Banker................. | 74/339 X |
| 2,534,726 | 12/1950 | Moore.................. | 254/187 R X |
| 3,296,893 | 1/1967 | Shaffer et al............... | 254/187 R X |
| 3,460,807 | 8/1969 | Prikhodko et al........... | 74/750 R X |

FOREIGN PATENTS OR APPLICATIONS

| | | | |
|---|---|---|---|
| 622,214 | 11/1935 | Germany.......................... | 192/4 C |

Primary Examiner—Benjamin W. Wyche
Assistant Examiner—J. Reep

[57] ABSTRACT

This invention relates to a two-speed primary drive assembly for a hydraulic winch whereby the winch may be used in either a fast or slow range of speed depending upon the function for which it is used. The primary drive has no neutral position so that the shift is directly from one speed to another and the speed change is done with the winch in a locked or "brake-on" position. The change of gears during a time when the shafts are not free to rotate is made possible by incorporation of cylindrical change gears having every second spline tooth removed and adapted to engage with a shifter sleeve likewise having every second spline tooth removed. The front portion of the splines on both the change gears and the shifter sleeve are chamfered to allow camming of the two elements about their axes when the front portions are axially forced into contact with each other. The change gears are rotationally spring biased such that they are continuously urged to a position whereat the splines are respectively centered.

4 Claims, 8 Drawing Figures

SOMMERVILLE G. CHRISTISON
INVENTOR.

SOMMERVILLE G. CHRISTISON
INVENTOR.

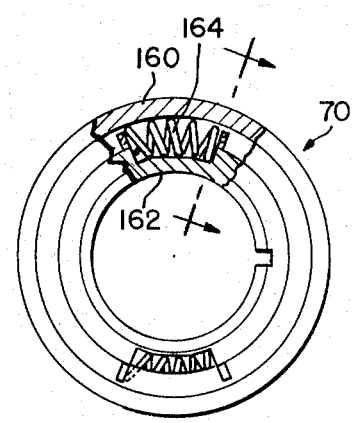
FIG. 4
FIG. 5
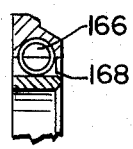
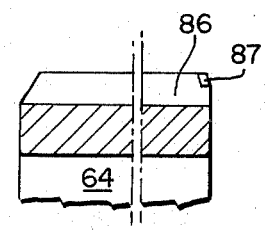
FIG. 6
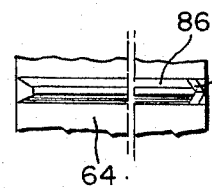
FIG. 7
FIG. 8
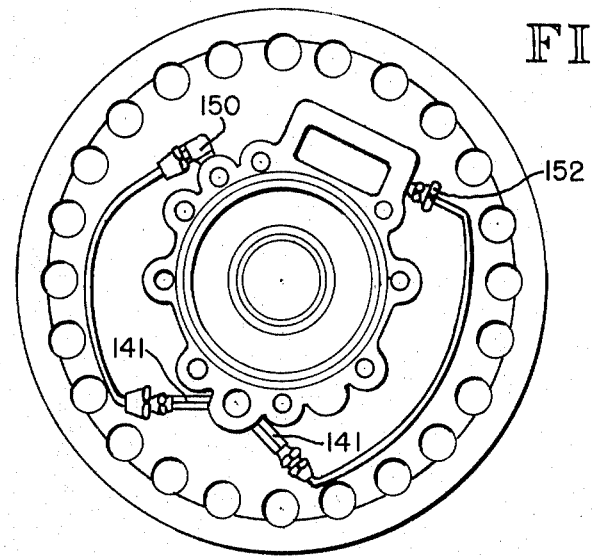
SOMMERVILLE G. CHRISTISON
INVENTOR.

TWO SPEED PRIMARY DRIVE ASSEMBLY FOR HYDRAULIC WINCH

BACKGROUND OF THE INVENTION

Hydraulic hoist units have been used on cranes on the American continent for the past 30 or 40 years. Hydraulic hoists for use on a crane must be capable of smooth control both in hoisting and lowering under all load conditions. The maximum possible range of line speed is required for a variety of jobs ranging from fast concrete pouring work to the inching control required for setting steel. The hoist should in addition to the above have an automatic brake which will hold the load suspended indefinitely whenever the winch is not being powered. All of the above features including a provision for the free fall are well known in the art and fully described in Paper Number 700726 published September, 1970 by the Society of Automotive Engineers at the combined National Farm, Construction and Industrial Machinery In Power Plant Meeting in Milwaukee, Wisconsin. This particular paper was authored by S. G. Christison, inventor of the present concept.

Whereas the above referenced winches have proven to be very satisfactory in many operations it has been found desirable to provide a winch having more than one speed or mode of operation whereby the operator may select the rate at which the load is moved making the winch itself extremely more versatile. To this end, efforts have been made in the past to provide a drive assembly for a winch wherein the internal gearing could be changed, thereby changing the rate at which the load is moved.

Exeamples of the heretofore mentioned efforts are found in U.S. Pat. No. 3,375,738 granted Apr. 2, 1968 to N. L. Love describing a variable speed drive for use with agricultural equipment and probably applicable to a winch, U.S. Pat. No. 3,460,807 granted Aug. 12, 1969 to Prikodko et al. showing a multi speed reduction for use with a heavy mobile vehicle and U.S. Pat. No. 3,487,723 granted Jan. 6, 1970 to Piot showing another example of an epicyclic gear box.

The Prikohodko patent incorporates planet gears to form a compound gear. The patents to Love and Rutkowski both utilize a neutral position. The Piot patent uses friction brakes and or clutches to select the various gear ratios.

With the above noted art in mind it is an object of the present invention to provide a primary drive assembly for a winch wherein the assembly includes the incorporation of two separate speed ranges and yet does not include a neutral position whereat the load might well be out of control since there is no direct connection between the load and the motor when a neutral position is incorporated in assemblies of this type.

It is another object of the present invention to provide a two-speed winch wherein the gear change is made with both the input and output shafts in fixed position and not free to rotate.

Still another object of the present invention is to provide a primary drive assembly for a hydraulic winch wherein the assembly includes two driving speeds, the operational connection, being made by a shifter sleeve always engages either one or the other of the drive trains.

In regard to the present invention it is an object to provide a shifting mechanism wherein the elements to be driven as well as the driving element are fixed and not free to rotate during the time the gear change is made and therefore one of the elements to be engaged is capable of a slight deflection to assist in the engagement.

Still a further object of the present invention is to provide a pair of engageable driving elements having splines wherein each of the elements has alternate spline teeth removed thus requiring less accurate alignment between the elements before axial engagement may be instituted.

BRIEF DESCRIPTION OF THE DRAWINGS

FIG. 4 is an enlarged view, partially broken away for clarity of one of the spring biased centering means.

FIG. 5 is a sectional view along lines 5—5 of FIG. 4.

FIG. 6 is an elevational view of one of the gear teeth in the change gear.

FIG. 7 is a plan view of the gear tooth of FIG. 6.

FIG. 8 is an end view of the primary drive assembly showing the relative placement of the ports for the motor and the detent control.

DETAILED DESCRIPTION OF THE DRAWINGS

Figure 1:
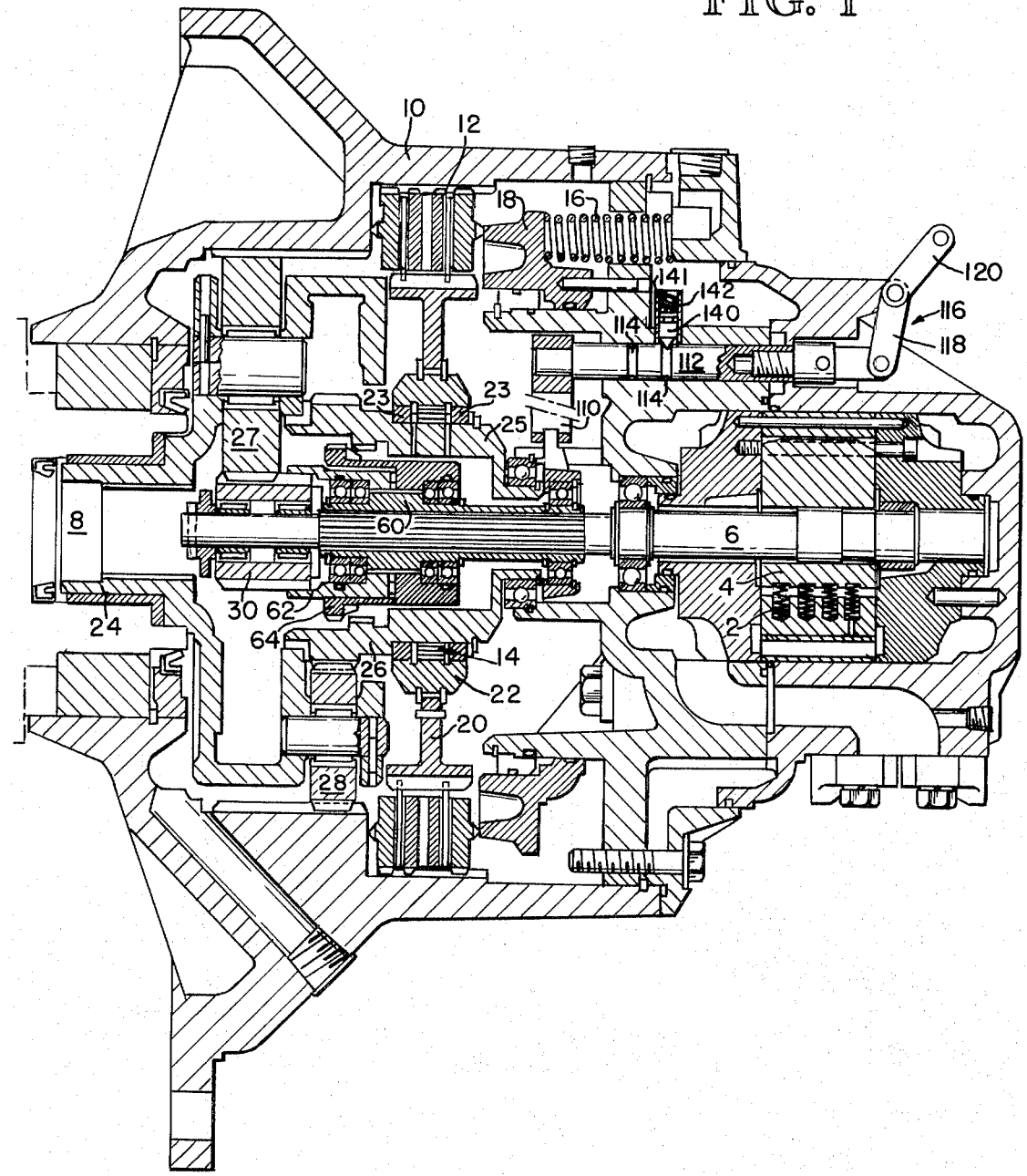
FIG. 1 is a sectional view through the preferred embodiment of the primary drive assembly for a two-speed winch.

As can be seen in FIG. 1 the righthand portion of the assembly, as shown, comprises a hydraulic motor having a vane 2, a rotor 4 and a drive shaft 6. It is believed that the elements of a hydraulic motor are well known in the art so that further description at this point is not necessary.

The hoist of which this primary drive assembly is to be a part comprises the primary drive assembly hereinafter described and a final drive assembly both fastened to a base which holds the housings of the two drives concentric. The cable drum is normally carried on antifriction bearings between the drive housings.

The primary drive housing contains an hydraulic motor, described above, which powers a pair of sun gears of a primary two-speed planetary reduction hereinafter described. The output of the reduction is transmitted by a shaft which passes through the center of the cable drum to the sun gear of a final planetary reduction and final drive housing. The output of the final planetary reduction is transmitted directly to the cable drum through a spline attached to the final drive planet of the cable drum. As can be seen, to the left of the figure the planet hub 8 has splined thereto the shaft, not shown, which passes through the center of the drum to a final drive assembly.

The primary housing 10 which includes the hydraulic motor and the two-speed reduction, to be hereinafter described, also contains a metallic friction disc type brake 12 which is attached to the sun gear of the primary two-speed planetary reduction by a cam type overrunning clutch 14. The brake is held engaged by the springs 16 and is released by an annular hydraulic cylinder 18. Mechanically linking the brake 12 and the clutch 14 are the brake ring 20 and the brake hub 22. The brake is held engaged at all times preventing rotation of the drum until the hoist is powered to pay out cable. The brake hub 22 forms the outer race of the overrunning clutch 14 and is carried on roller bearing assemblies 23 on each side of the clutch 14. The hub 25 of the high speed sun gear 26 forms the inner race for the overrunning clutch 14 and the roller bearings 23. When the hoist is powered in a hoisting direction of rotation, the overrunning clutch 14 permits the high speed sun gear 26 to run and transmit power from the hydraulic motor to the cable drum when the winch is operating in its high speed range and to rotate freely when the winch is operating in its low speed range as hereinafter described. When the hoist is stopped by moving the motor control valve to neutral the cable load causes the cam clutch to lock up and the load is held by the friction brake.

The design of the automatic brake in conjunction with the hydraulic motor is old and fully described in U.S. Pat. No. 3,184,018.

Planet hub 24 contains two planetary gear ratios, high gear 28 which provides approximately a 3 to 1 reduction and low gear 27 which provides approximately 6 to 1 rate reduction. In order to permit the change of gear ratios while a load is suspended from the cable drum a synchro mesh mechanism is used to engage the motor shafts 6 with either the low sun gear 30 or the high sun gear 26. The synchro mesh mechanism is designed such that it may change gears when the motor shaft 6 and the sun gears 26 and 30 are not free to rotate.

In general terms the hydraulic motor drives the shaft 6 which in turn drives a shifter sleeve 60 having splined thereto a pair of change gear mechanism 62, 64 whereby the desired ratio of drive is selected and engaged.

Figure 2:
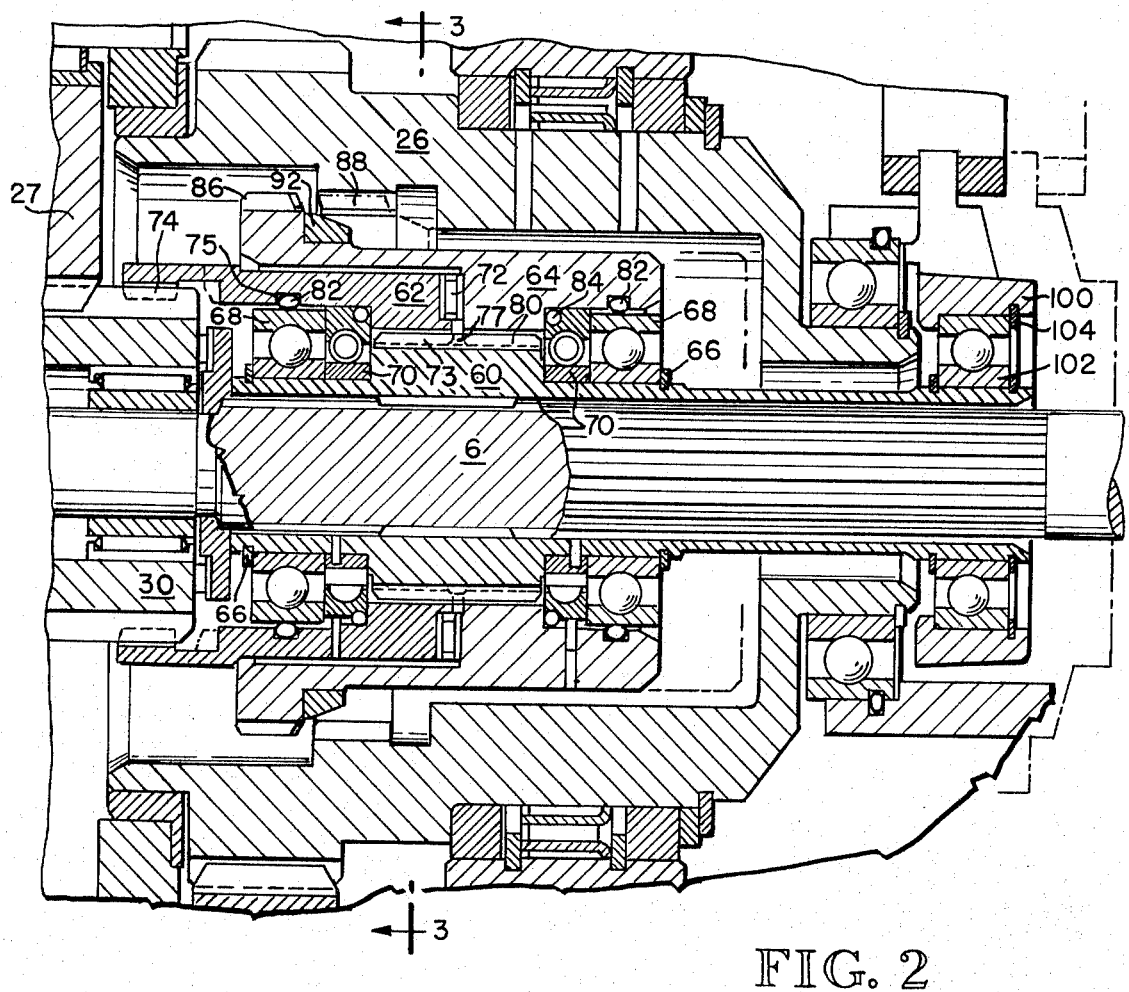
FIG. 2 is an enlarged portion of FIG. 1 illustrating the actual gear shift mechanism.

Referring now in particular to FIG. 2 wherein the synchro mesh or gear shift mechanism as shown in enlarged scale it can be seen that the drive shaft 6 has splined thereto shifter sleeve 60 which in turn is splined to change gears 62 and 64 continuously driving them. Change gears 62 and 64 move with the shifter sleeve as a unit, by means to be hereinafter described, since they are locked within the externally splined area by a combination of snap rings 66 bearings 68 and a spring mechanism 70, to be hereinafter described. Between the two change gears is a thrust bearing 72 allowing relative rotation therebetween.

Change gear 62 is generally cylindrical in shape having a smooth exterior and internal splines 74, to be described in further detail hereinafter, at one end, an O-ring receiving groove 75 approximately midway along the length of the change gear 62 and a second set of internal spline teeth 73 radially inwardly from the first set 72.

Change gear 64 is likewise generally cylindrical in shape and is mounted coaxial with and partially surrounding one end of change gear 62. Change gear 64 has an internally directed flange which abuts the opposite side of the thrust bearing 72 which abuts the end of change gear 62. Immediately adjacent the portion of change gear 64 which abuts the thrust bearing 72 there is an internal spline 80 which is identical to the spline 77 of shifter sleeve 60 as is the internal spline 75 of change gear 62. As can be seen in the figure the internal spline 80 is intermediate the ends of the change gear 64 and the end of the change gear 64 opposite the end surrounding change gear 62 extends towards the hydraulic motor and surrounds the bearing 68. Change gear 64 is concentrically located with respect to bearing 68 and yieldably spaced therefrom by means of O-ring 82. Change gear 64 is similarly held in position relative to spring 70 by means of O-ring 84. The opposite end of change gear 64 from the thrust bearing 68 has an outwardly facing spline 86 adapted to selectively engage an internal spline 88 mounted upon sun gear 25. Likewise mounted to change gear 64 is a pilot ring 92 for purposes to be hereinafter described.

The entire shifting assembly including the shifter sleeve 60 the two change gears 62, 64, the bearings 68 and spring assemblies 70 are adapted to move as a unit. Referring back to FIG. 1, to be read in conjunction with FIG. 2, it can be seen that the position of shifting assembly is controlled by means of a bearing housing secured to the shifter sleeve by means of bearing 102 held in place by snap rings 104. The position of the bearing housing and therefore the shifter sleeve 60 is controlled by means of shifter fork 110 secured to the inner end of shaft 112 which has a pair of circumferentially spaced grooves 114. The outer end of the shaft 112 has secured thereto a handle mechanism 116 including links 118, 120, placing the location of the shifter sleeve under the control of the operator controlling the speed and direction of the hydraulic motor. As can be seen in FIG. 8 there is a pair of detent pawls 140 in sleeves 141 located radially in the same plane so that both pawls engage with each detent groove when the shifter fork is moved to either the high gear or low gear position. The detent pawls are spring loaded by means of spring 142 and also hydraulically loaded as described hereinafter. One detent pawl is connected to the hoisting port of the motor 150 and the other detent pawl chamber is connected to the lowering port 152 of the hydraulic motor. This arrangement provides a hydraulic lock on the shifter fork when the motor is powered in the hoisting or lowering position thus preventing the shifter fork from being moved while the motor is being driven in either direction. The spring loading serves to center the pawl 140 within the groove assuring proper placement of the shifting assembly.

In the hereinabove described design of the synchronous transmission the change gears 62, 64 are so located that one or both of the change gears are engaged in their respective sun gear during the gear change. This eliminates the neutral position while the gear selection is made from high gear to low gear or vice versa. This also insures that the hydraulic motor is always connected by gearing to the cable drum and prevents the danger of loss of content in the event of a possible malfunction of the automatic brake which could occur if a neutral condition existed as the change gears were moved from one gear ratio to the other.

Figure 3:
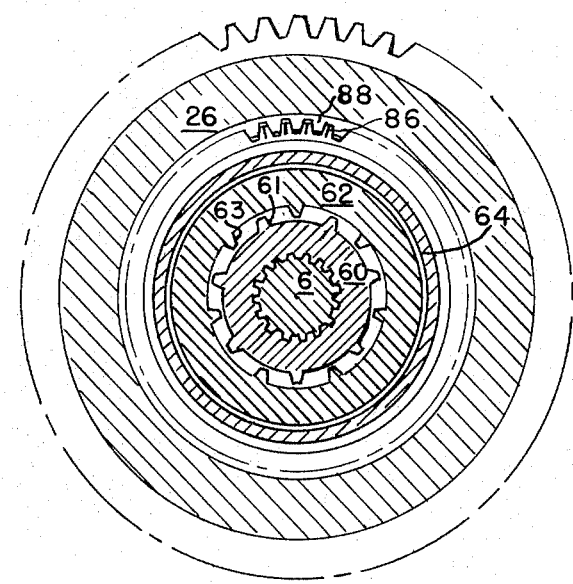
FIG. 3 is a sectional along lines 3—3 of FIG. 2.

Referring now to FIG. 3 it can be seen that the drive shaft 6 is splined by conventional methods to the shifter sleeve 60 which has external splines 61 every other one of which has been removed. The section line which defines this figure passes through change gear 62 which has internal splines 63, every other one of which is removed. The removal of alternate spline teeth on the shifter sleeve and the change gear allows relative movement between the shifter sleeve 60 and the change gear 62. It is to be understood that although the section passes through change gear 62 a similar configuration of the spline teeth is provided with respect to shifter sleeve 60 and change gear 64. Proceeding outwardly it can be seen that the change gear 64 which as noted above partially circumscribes the change gear 62 has external spline teeth 86 to engage with internal teeth 88 of sun gear 26.

As seen in FIG. 2 and described hereinabove a pair of annular spring units 70 are secured in position between the change gear 62 and shifter sleeve 60 and likewise between change gear 64 and shifter sleeve 60. The spring units 70 which are illustrated in detail in FIGS. 4 and 5 are frictionally held in position between the adjacent units whereby when either the internal or external element of the spring unit rotates under the spring force, as hereinafter described, the associated change gear will be urged to its centrally located position such that its spline tooth is approximately midway between the two splined teeth of the shifter sleeve. As can be seen in FIG. 4 the spring unit comprises an outside ring 160, an inside ring 162 and a spring 164 mounted therebetween. As can be seen in FIG. 5 the outside ring has an inwardly facing groove to accommodate the spring and a spring abutting surface 166. The internal ring likewise has a spring receiving area and a spring abutting surface 168. When the two rings are put into coaxial relationship with a pair of springs mounted within the appropriate places the rings are constantly urged to hold the same relative position and yet are free to rotate within the limits of the compression in the springs.

As noted above when the gear change is accomplished both the input and the output shafts are locked in position and not free to rotate. Therefore it can be seen in FIGS. 6 and 7 the teeth 86 upon change gear 64 and the teeth 76 of change gear 62 are chamfered as at 87 such that when the gear change is made the tooth 86 will be forced into face to face contact with the tooth 88 and the chamfered portion will cause the change gear 64 to rotate against the force of the spring 164 as hereinabove described until it can slip between the teeth 88. Once the teeth 86 and 88 are in engagement the power can again be applied to the input shaft 6 which will place the splines 61 and 63 in face to face contact providing a solid mechanical link between the input shaft 6 the shifter sleeve 60 and change gear 62 and the sun gear 30. As hereinabove described the gear change would be through the low range thus driving the winch at a slower speed. In order to shift to the higher range shaft 112 would be moved such that the pocket would go into the other groove 114 and change gear 64 would be placed in contact with high speed sun gear 26 thus driving the planetary.

I claim:
1. A multiple speed drive assembly, comprising
A. a support;
B. an input shaft and an output shaft rotatably mounted, respectively, on said support; and
C. gear change means interconnecting said input and output shafts for selectively varying the drive ratio between said input and output shafts, said gear change means including
   1. a first gear train having a first predetermined ratio,
   2. a second gear train having a second predetermined ratio different from said first predetermined ratio, and
   3. shifter means mounted within said housing for maintaining at all times a positive drive between said input and output shafts, said shifter means including
      a. selector gear means for connecting said input shaft to said output shaft through said first gear train when said selector gear means is in a first position and for connecting said input shaft to said output shaft through said second gear train when said selector gear means is in a second position, said selector gear means including first and second change gears adapted to selectively engage said first and second gear trains, respectively, and
      b. synchro mesh mounting means connected between one of said shafts and said change gears for permitting limited rotational movement of said change gears relative to said one of said shafts as said selector gear means is moved between said first and second positions, whereby said selector gear means is adapted to mesh with said first and second gear trains even though said input and output shafts are stationary.

2. A drive assembly as in claim 1 wherein the shifter means includes a splined sleeve mounted upon the input shaft, which sleeve is selectively, axially moveable from a first position engaging the first gear train to a second position engaging the second gear train while being engaged with at least one gear train at all times.

3. A drive assembly as in claim 1 wherein the change gears are each adapted to selectively engage a sun gear of a planetary gear system.

4. A drive assembly as in claim 1 wherein the ends of the change gears are chamfered, whereby the relative axial movement of said gear and contact of the chamfered portion causes relative rotational movement in the event of misalignment.

* * * * *